United States Patent
Kim et al.

(10) Patent No.: US 8,822,093 B2
(45) Date of Patent: Sep. 2, 2014

(54) COOLING SYSTEM FOR FUEL CELL VEHICLE

(75) Inventors: Hag Se Kim, Gyeonggi-do (KR); Kil Woo Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 179 days.

(21) Appl. No.: 13/313,965

(22) Filed: Dec. 7, 2011

(65) Prior Publication Data
US 2013/0065148 A1   Mar. 14, 2013

(30) Foreign Application Priority Data
Sep. 9, 2011   (KR) .................. 10-2011-0091607

(51) Int. Cl.
  *H01M 8/04*   (2006.01)
(52) U.S. Cl.
  USPC ........................................... 429/436
(58) Field of Classification Search
  None
  See application file for complete search history.

(56) References Cited

U.S. PATENT DOCUMENTS

| 6,651,761 | B1 | 11/2003 | Hrovat et al. | |
|---|---|---|---|---|
| 2011/0053025 | A1* | 3/2011 | Kim et al. | 429/435 |
| 2011/0296855 | A1* | 12/2011 | Johnston et al. | 62/79 |

FOREIGN PATENT DOCUMENTS

| JP | 2005329818 A | 12/2005 |
|---|---|---|
| JP | 2006327325 | 12/2006 |
| KR | 10-2011-0023345 | 3/2011 |
| KR | 10-2011-0023345 A | 3/2011 |
| KR | 10-2011-0051829 | 5/2011 |
| KR | 10-2011-0062418 | 6/2011 |

* cited by examiner

*Primary Examiner* — Patrick Ryan
*Assistant Examiner* — Wyatt McConnell
(74) *Attorney, Agent, or Firm* — Edwards Wildman Palmer LLP; Peter F. Corless

(57) ABSTRACT

Disclosed is a cooling system for a fuel cell vehicle which employs a single integrated radiator disposed on a front side of the vehicle and configured to cool cooling fluid by exchanging heat using exterior air to integrally manage a fuel cell stack and an electrical power apparatus. More specifically, the integrated radiator is divided into a first high temperature region and a second low temperature region according to a flow requirements so that the fuel cell stack is cooled with cooling fluid flowing through the high temperature region and the electrical power apparatus is cooled with cooling fluid flowing through the low temperature region.

5 Claims, 4 Drawing Sheets

COOLING SYSTEM FOR FUEL CELL VEHICLE

CROSS-REFERENCE TO RELATED APPLICATION

This application claims under 35 U.S.C. §119(a) the benefit of Korean Patent Application No. 10-2011-0091607 filed Sep. 9, 2011, the entire contents of which are incorporated herein by reference.

BACKGROUND (a) Technical Field

The present invention relates to a cooling apparatus for a fuel cell vehicle. More particularly, it relates to a cooling apparatus for a fuel cell vehicle by which an amount of air passing by a radiator can be increased.

(b) Background Art

A fuel cell for a fuel cell vehicle converts chemical reaction energy produced by a chemical reaction between oxygen and hydrogen to electrical energy to generate a driving force. In the process, thermal energy is generated by the chemical reaction in the fuel cell, in which case it is inevitably necessary to remove the generated heat to secure the required performance from the fuel cell.

FIG. 1 is a view schematically illustrating an example of a conventional cooling module for a fuel cell vehicle. The cooling apparatus for a fuel cell vehicle includes a condenser 1, radiators, and a cooling fan 4 in order to cool a driving system including an electric power apparatus such as an inverter and a motor and a fuel cell stack. Here, the radiators are classified into a radiator 2 for an electrical power apparatus and a radiator 3 for a fuel cell stack, which are installed separately. The radiator 2 for an electrical power apparatus is disposed below the condenser 1, and the radiator 3 for a fuel cell stack is disposed between the condenser 1 and the cooling fan 4.

Cooling fluid is supplied to the electrical power apparatus and the fuel cell stack via the radiator 2 for an electrical power apparatus and the radiator 3 for a fuel cell stack respectively through separate circulation lines, and the supplied cooling fluid is continuously flown into the radiator 2 for an electrical power apparatus and the radiator 3 for a fuel cell stack. The process is repeated to circulate the cooling fluid therethrough, cooling the electrical power apparatus and the fuel cell stack for the fuel cell vehicle.

Meanwhile, as illustrated in FIG. 2, the fuel cell stack generates only a small amount of heat while idling or at low speeds, but the amount of generated heat rapidly increases as the vehicle increases its speed unlike in an internal combustion engine. As illustrated in FIG. 3, as the speed of a vehicle increases, a performance of a radiator cannot keep up with the amount of heat generated by the fuel cell. Thus, the conventional radiator system insufficient at speeds above 100 kph.

Further, because the condenser and the radiator 2 are largely air-resisting due to their location on the vehicle, a capacity of the cooling fan 4 must be greatly increased in order to account for their resistance. Moreover, when a size of the radiator is increased to satisfy a heat radiating performance of the fuel cell stack, a layout of the system becomes complex and packaging/front end collision characteristics of the vehicle are degraded as a result.

SUMMARY OF THE DISCLOSURE

The present invention provides a cooling apparatus for a fuel cell vehicle which employs an integrated radiator and applies a water cooling heat exchanger instead of a conventional condenser and a radiator for an electrical power apparatus. More specifically, the number of air flow resisting elements on a front side of the vehicle is minimized by removing the conventional condenser and the radiator for an electrical power apparatus, making it possible to reduce and simplify a cooling module and optimize a capacity of a cooling fan.

In one aspect, the present invention provides a cooling apparatus for a fuel cell vehicle, including: a single integrated radiator disposed on a front side of the vehicle and configured to cool a cooling fluid by exchanging heat using exterior air to integrally manage a fuel cell stack and an electrical power apparatus. The integrated radiator is classified into a high temperature region and a low temperature region according to a flow form of the cooling fluid such that the fuel cell stack may be cooled with cooling fluid flowing through the high temperature region and the electrical power apparatus is cooled with cooling fluid flowing through the low temperature region.

In one exemplary embodiment, the high temperature region and the low temperature region are disposed on a same plane of the integrated radiator. After being cooled while passing through the high temperature region, some of the cooling fluid for the fuel cell stack cools the fuel cell stack, and after being additionally cooled while sequentially passing through the high temperature region and the low temperature region, some of the cooling fluid for the fuel stack cools the electrical power apparatus as well.

The high temperature region may have a cooling fluid passage extending linearly downward to guide cooling fluid for the fuel cell stack downward. The low temperature region has a cooling fluid passage in an irregular meandering form where the cooling fluid passage alternatingly extends upward and downward, and the cooling fluid which has passed through the high temperature region is exposed to exterior air for a longer period of time to allow for additional cooling time.

The cooling apparatus of claim 1 may further includes a plate type heat exchanger configured to cool the electrical power apparatus by exchanging heat with the cooling fluid being pumped through and from the electrical power apparatus using some of the cooling fluid flowing through the integrated radiator to cool the electrical power apparatus.

In some exemplary embodiments, after the cooling fluid for the fuel cell stack, which is discharged from the integrated radiator, passes through the plate type heat exchanger and then condenses a refrigerant with a water cooling heat exchanger, the cooling fluid for the fuel cell stack merges into the cooling fluid for the fuel cell stack which is immediately discharged from the high temperature region.

Accordingly, the present invention provides the following effects.

The heat radiating efficiency of an integrated radiator can be enhanced not by cooling a stack, a condenser, and an electrical power apparatus individually but rather by integrally managing a fuel cell stack 16 and an electrical power apparatus 14 using cooling fluid flowing through the single integrated radiator.

Further, the integrated radiator 10 is classified into a high temperature region and a low temperature region according to a flow form of cooling fluid, such that a large amount of cooling fluid is guided in a downstream direction for a short time in the high temperature region to cool the fuel cell stack 16 generating a large amount of heat and the cooling fluid which has passed through the high temperature region flows long in an S-like form in the low temperature region to additionally perform a cooling operation. Thus, the electrical power apparatus 14 which generates only a small amount of heat can be cooled by using the cooling fluid for the fuel cell stack in the low temperature region.

Moreover, although an amount of air blown by a fan is conventionally set to be excessive to meet a specification according to a maximum amount of heat of a fuel cell stack 16, when a general travel condition or a cooling performance of a radiator is marginal, the cooling apparatus can be used to cool other parts of the vehicle as well. Thus, the entire fuel cell vehicle system can be thermally managed efficiently through the integrated radiator.

In addition, by applying a water cooling heat exchanger instead of applying a radiator for an electrical power apparatus, i.e., a conventional air cooling heat exchanger, and a condenser, air resistance due to a radiator for an electrical power apparatus and a condenser installed on a front side of the vehicle can be removed, making it possible to simplify a cooling module on the front side of the vehicle. Furthermore, a front collision performance of the vehicle can be enhanced by reducing a size of the cooling module, making it possible to improve a product value.

As a conventional radiator for an electrical power apparatus and a condenser are removed, a flow resistance of air introduced through a grill on the front side of the vehicle can be minimized and a capacity of a fan motor can be reduced at the same time.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter, an exemplary embodiment of the present invention will be described with reference to the accompanying drawings so that those skilled in the art can easily carry out the invention.

It is understood that the term fuel cell "vehicle" or "vehicular" or other similar term as used herein is inclusive of all types of fuel cell motor vehicles in general such as passenger automobiles including sports utility vehicles (SUV), buses, trucks, various commercial vehicles, watercraft including a variety of boats and ships, aircraft, and the like, and includes hybrid fuel cell vehicles, electric motor powered fuel cell vehicles, auxiliary plug-in fuel cell hybrid electric vehicles, hydrogen-powered fuel cell vehicles and other alternative fuel cell vehicles (e.g., fuels derived from resources other than petroleum).

Figure 1:
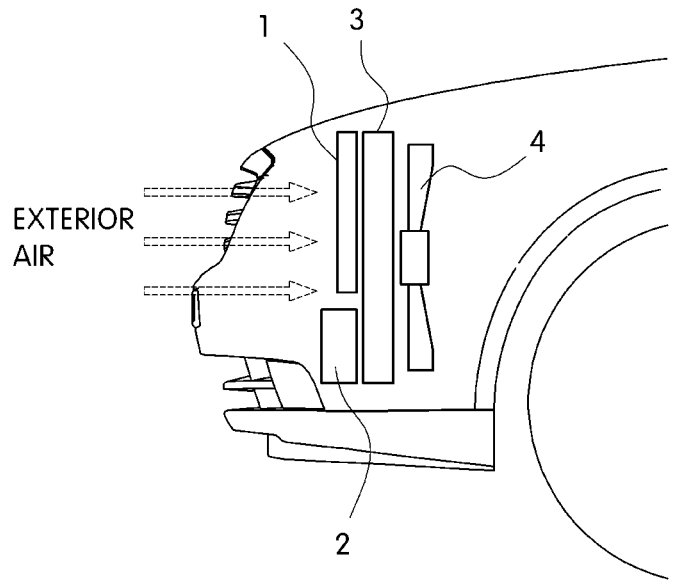
FIG. 1 is a view schematically illustrating an example of a conventional cooling module for a fuel cell vehicle.
Figure 2:
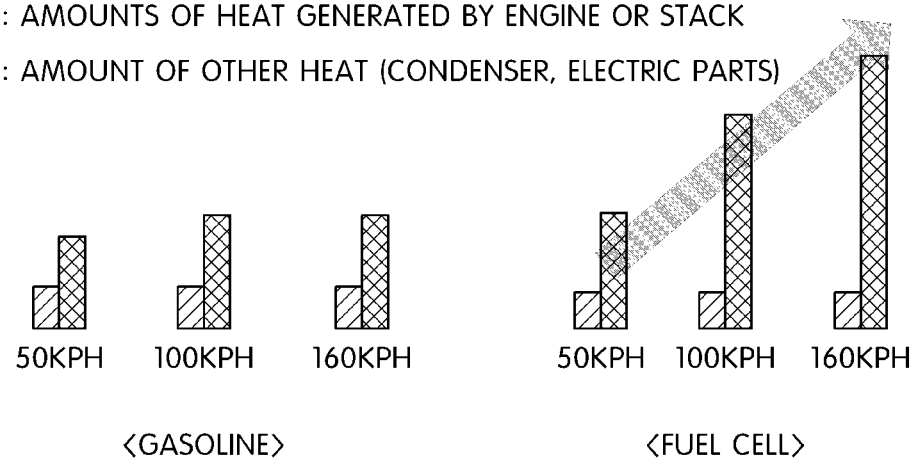
FIG. 2 illustrates bar graphs where amounts of heat generated by an engine and a fuel cell stack are compared.
Figure 3:
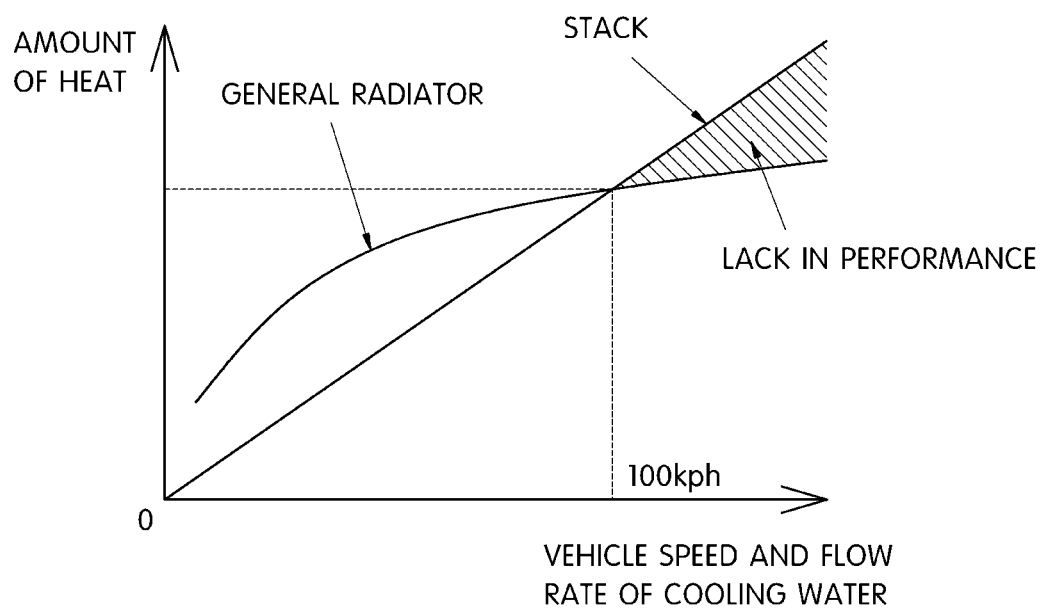
FIG. 3 illustrates a graph where amounts of heat generated by an engine and a fuel cell stack are compared based on temperatures of a cooling fluid.
Figure 4:
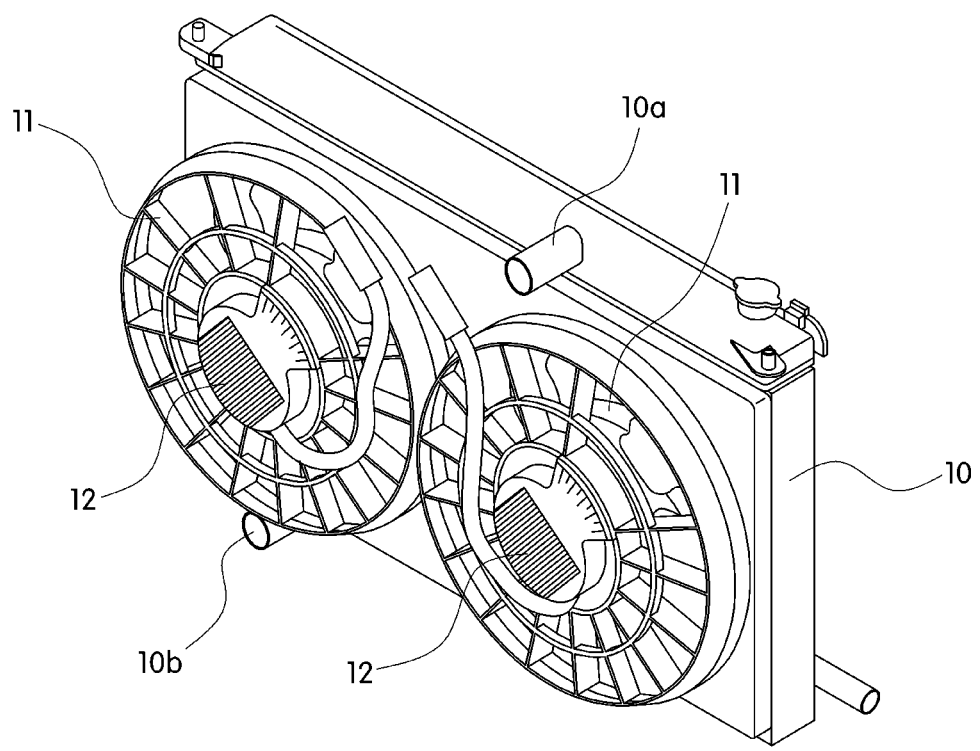
FIG. 4 is a perspective view of a cooling apparatus for a fuel cell vehicle, which has an integrated radiator according to an embodiment of the present invention.
Figure 5:
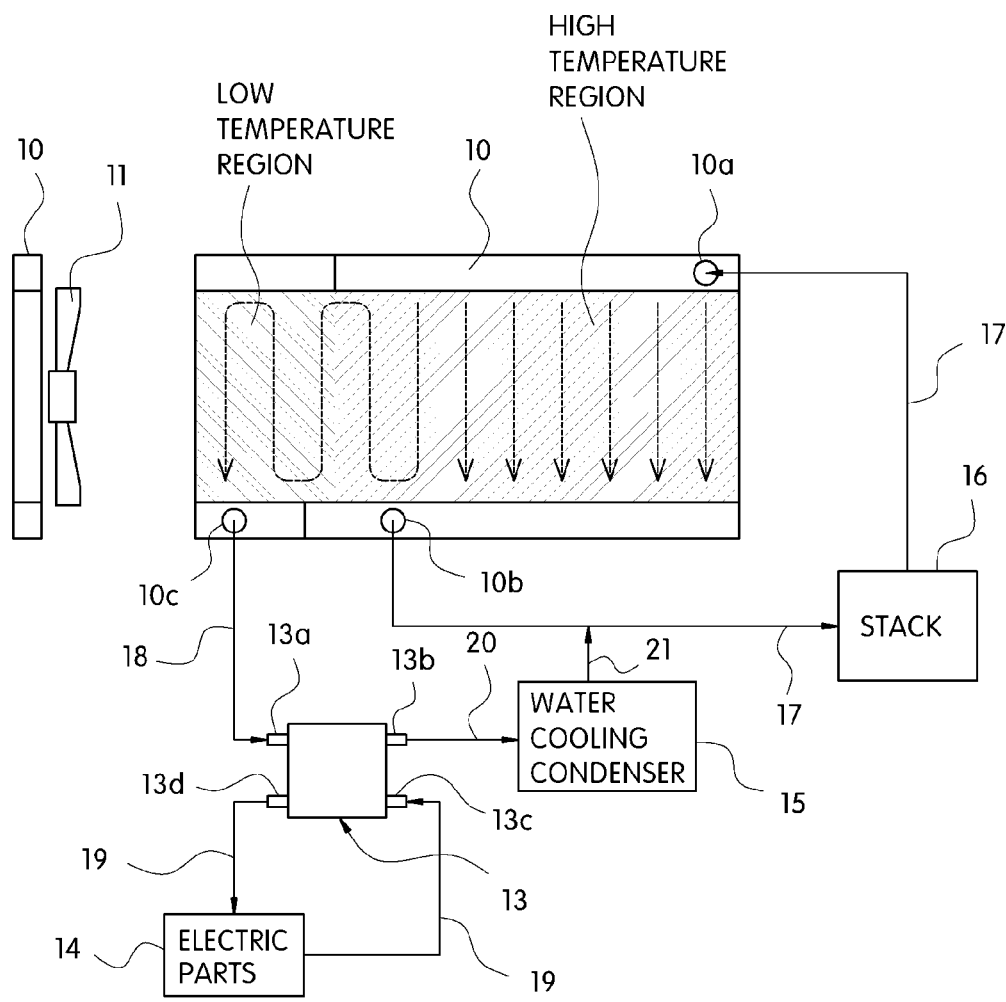
FIG. 5 is a diagram schematically illustrating main elements of the cooling apparatus of FIG. 4.

FIG. 4 is a perspective view of a cooling apparatus for a fuel cell vehicle which has an integrated radiator according to an embodiment of the present invention. FIG. 5 is a diagram schematically illustrating main elements of the cooling apparatus of FIG. 4. The present invention relates to a cooling apparatus for a vehicle where an increase in an amount of cooling air is not influenced by a conventional condenser and a radiator for an electrical power apparatus.

The cooling apparatus for a fuel cell vehicle according to the present invention includes an integrated radiator 10 and a cooling fan 11. The cooling fan 11 guides exterior air through the radiator disposed on the front side of the vehicle. The fan 11 can be exposed so that exterior air can be introduced into the vehicle through a radiator grill on the front side of the vehicle. The integrated radiator 10 has a cooling fluid passage through which cooling fluid flows. After introduced external cold air exchanges heat with cooling fluid flowing through the cooling fluid passage, the cooled cooling fluid is supplied to a fuel cell stack 16 and an electrical power apparatus 14 and circulated therethrough.

The integrated radiator 10 has a rectangular shape. The size, flow rate, and flux of the radiator should be designed to handle an entire amount of heat generated in the fuel cell vehicle system. The radiator may be classified into a high temperature region and a low temperature region according to a flow type of the cooling fluid flowing through the radiator. In this case, the cooling fluid flowing through the high temperature region is used to cool the fuel cell stack 16, and the cooling fluid flowing through the low temperature region is used to cool the electrical power apparatus 14 (including an inverter and a motor).

The high temperature region has a heat radiating area larger than the low temperature region. The cooling fluid flows linearly downward from an upper end of the radiator, in which case the amount of cooling fluid flowing through the high temperature region is greater than an amount of cooling fluid flowing through the low temperature region. For example, the amount of cooling fluid flowing through the high temperature region may be 150 to 200 L/min (LPM).

When cooling fluid linearly flows vertically, the amount of cooling fluid is greater. However, a flow path for cooling fluid from an upper end to a lower end of the radiator is short, thus the exposure time of the cooling fluid in which it is exposed to exterior air, i.e., a time for exchanging heat with exterior air is short as well. Therefore, the temperature of cooling fluid is higher at the high temperature region than at the low temperature region.

A heat radiating area in the low temperature region is smaller than that in the high temperature region, and cooling fluid flows upward and downward in an S-like form at an upper end of the radiator. Then, an amount of cooling fluid flowing through the low temperature region is less than an amount of cooling fluid flowing through the high temperature region. For example, the amount of cooling fluid in the low temperature region may be 50 to 100 LPM.

Since cooling fluid flows in an S-like form in the low temperature region, a decreased amount of cooling fluid will flow therethrough. However, the exposure time of cooling fluid for exchanging heat with exterior air is increased because the flow path which is curved in a vertical direction of the radiator is longer than in the high temperature region, resulting in a lower temperature in the low temperature region than what is produced in the high temperature region.

A first cooling fluid circulating line 17 is connected between the integrated radiator 10 and the fuel cell stack 16 to cool the fuel cell stack 16, so cooling fluid can circulate through the fuel cell stack 16 and the radiator via the first cooling circulating line 17 to cool the fuel cell stack 16. A cooling introducing pipe 10a is formed at an upper end side U (the high temperature region) of the integrated radiator 10, and the cooling fluid heated by the fuel cell stack 16 is introduced into the radiator through the cooling fluid introducing pipe 10a.

A first cooling fluid discharging pipe 10b is formed at a lower end side L of the high temperature region of the integrated radiator 10 and the majority of the cooling fluid (approximately two thirds of the introduced cooling fluid) flowing through the high temperature region is discharged through the first cooling fluid discharging pipe 10b and is supplied to the fuel cell stack 16.

A second cooling fluid discharging pipe 10c is formed at an opposite lower end side OL (the low temperature region) of the integrated radiator 10, and the cooling fluid flowing through the high temperature region and the low temperature region is discharged through the second cooling fluid discharging pipe 10c and is supplied to the plate type heat exchanger 13. The diameters of the cooling fluid introducing pipe 10a and the first cooling fluid discharging pipe 10b are preferably larger than a diameter of the second cooling fluid discharging pipe 10c of the fuel cell stack 16.

Since the amount of heat generated by the fuel cell stack 16 is greater than the amount of heat generated by the electrical power apparatus 14 and the condenser, by increasing the amount of cooling fluid supplied to the fuel cell stack 16, the present invention allows the vehicle to operate at higher speeds for a longer period of time than the conventional system.

Furthermore, the cooling fluid flowing through the interior (the high temperature region plus the low temperature region) of the integrated radiator 10 is the cooling fluid for the fuel cell stack, and is distinguished from the cooling fluid for the electrical power apparatus. That is, the cooling fluid for the fuel cell stack is a fluid used to cool the fuel cell stack 16, e.g., water, while circulating through the interior of the fuel cell stack 16, and the cooling fluid for the electrical power apparatus is a fluid used to cool the electrical power apparatus 14 while circulating through the interior and a peripheral portion of the electrical power apparatus 14 such as an inverter and a motor.

The present invention provides a plate type heat exchanger 13 to cool the electrical power apparatus 14. The plate type heat exchanger 13 is a heat exchanger for cooling fluid, and exchanges heat with cooling fluid for the fuel cell stack and cooling fluid for the electrical power apparatus, so that the cooling fluid for the electrical power apparatus can be cooled by using the cooling fluid for the fuel cell stack discharged from the low temperature region of the integrated radiator 10.

The plate type heat exchanger 13 has first to fourth ports 13a to 13d utilized to exchange heat with the cooling fluid for the fuel cell stack and the cooling fluid for the electrical power apparatus. The first port 13a is an inlet port and is connected to the second cooling fluid discharging pipe 10c of the integrated radiator 10 through a first connecting line 18. Cooling fluid is supplied from the low temperature region of the integrated radiator 10 through the first port 13a.

The second port 13b is an outlet port and may be disposed diagonally from the first port 13a. The second port 13b is connected to the cooling fluid cooling condenser 15 through a second connecting line 20, and the cooling fluid for the fuel cell stack may be transferred to the cooling fluid cooling condenser 15 through the second port 13b.

The third port 13c and the fourth port 13d are inlet and outlet ports respectively. The third port 13c and the fourth port 13d are connected to the electrical power apparatus. After the cooling fluid for the electrical power apparatus is introduced through the third port 13c and is heat-exchanged with the cooling fluid for the fuel cell stack to be cooled, the cooled cooling fluid for the electrical power apparatus is discharged through the fourth port 13d to be supplied to the electrical power apparatus 14. In doing so, the cooling fluid for the fuel cell stack and the cooling fluid for the electrical power apparatus should not be mixed within the plate type heat exchanger 13.

The present invention also provides a fluid cooling condenser 15 configured to cool and condense a refrigerant in a fluid cooling manner using the cooling fluid, e.g., water, for the fuel cell stack in the low temperature region. The fluid cooling condenser 15 is connected to the plate type heat exchanger 13 through the second connecting line 20 so that the cooling fluid for the fuel cell stack in the low temperature region is supplied from the plate type heat exchanger 13.

The fluid cooling condenser 15 is connected to the first cooling fluid circulating line 17 through the third connecting line 21, so the cooling fluid for the fuel cell stack in the low temperature region which has passed through the fluid cooling condenser 15 merges into the cooling fluid for the fuel cell stack in the high temperature region. In this case, the plate type heat exchanger 13 and the water cooling heat exchanger are not of an air cooling type using exterior air, but rather is a liquid fluid cooling type using cooling fluid therein. Thus, the plate type heat exchanger 13 and the fluid cooling heat exchanger do not need to be located on a front side of the vehicle, thus replacing a conventional condenser and a radiator for an electrical power apparatus.

Hereinafter, an operation of the cooling apparatus for a fuel cell vehicle according to the present invention will be described.

The integrated radiator 10 has a high temperature region and a low temperature region classified according to a flow form of cooling fluid on a same plate in a widthwise direction of the body of the vehicle with respect to a lengthwise direction of the body. In this case, the high temperature region has a cooling fluid passage in a downstream direction. The flow of cooling fluid is linearly guided vertically upward and downward through the cooling fluid passage structure, making it possible to cool a large amount of cooling fluid while exposing the cooling fluid introduced from the fuel cell stack 16 into the radiator to exterior air for a short time.

The low temperature region has an S-shaped cooling fluid passage, and the flow of cooling fluid is guided upward and downward in a meandering direction through the cooling fluid passage structure. Thus, the cooling fluid for the fuel cell stack which has passed through the high temperature region may cool a small amount of cooling fluid while being additionally exposed to exterior air for a long time.

Hereinafter, a flow direction and an operation of cooling fluid for the fuel cell stack will be described.

The cooling fluid (e.g., at about 77° C.) for the fuel cell stack is introduced into the high temperature region of the integrated radiator 10 from the fuel cell stack 16 through the cooling fluid introducing pipe 10a of the integrated radiator 10, and a majority of the cooling fluid introduced into the high temperature region flows in a downstream direction through the cooling fluid passage in the high temperature region to exchange heat with exterior air. Additionally, some of the cooling fluid which has passed through the high temperature region flows into the low temperature region to additionally exchange heat with exterior air.

The cooling fluid for the fuel cell stack in the high temperature region exchanges heat with exterior air to be cooled, and the cooled cooling fluid (e.g., at 68° C.) for the fuel cell stack is discharged through the first cooling fluid discharging pipe 10b and is supplied to the fuel cell stack 16 through the first cooling fluid circulating line 17. Subsequently, the cooling fluid supplied to the fuel cell stack 16 circulates through the fuel cell stack 16 to absorb the heat generated by the fuel cell stack 16, thereby cooling the fuel cell stack 16 by heating the fluid flowing therethrough.

Next, the heated cooling fluid for the fuel cell stack returns to the integrated radiator 10 through the first cooling fluid circulating line 17 to be cooled, and the cooling fluid circulates continually to cool the fuel cell stack 16 through the process.

The cooling fluid which has additionally exchanged heat in the low temperature region is cooled to a temperature (to e.g., 50° C.) which is less than that of the cooling fluid in the high temperature region, and is discharged through the second cooling fluid discharging pipe 10c and is transferred to the plate type heat exchanger 13 through the first connecting line 18.

Subsequently, the cooling fluid for the fuel cell stack in the low temperature region which has been introduced into the plate type heat exchanger 13 exchanges heat with the cooling fluid for the electrical power apparatus using the plate type heat exchanger 13 to cool the cooling fluid for the electrical power apparatus. That is, the plate type heat exchanger 13 may cool the electrical power apparatus 14 by using some of the cooling fluid for the fuel cell stack that is supplied from the low temperature region of the integrated radiator 10.

In other words, the cooling fluid for the electrical power apparatus which has been cooled by the plate type heat exchanger 13 is introduced into the electrical power apparatus 14 through the second cooling fluid circulating line 19, and after the electrical power apparatus 14 is cooled by the cooling fluid is circulating through the electrical power apparatus 14, the cooling fluid returns to the plate type heat exchanger 13 to repeatedly circulate to cool the electrical power apparatus 14 through the above described process.

Subsequently, after the cooling fluid for the fuel cell stack in the low temperature region exchanges heat in the plate type heat exchanger 13 and then flows into the fluid cooling condenser 15 through the second connecting line 20, it condenses the refrigerant in the water cooling condenser 15 and flows through the second connecting line 20 to merge into/intersect with the cooling fluid for the fuel cell stack in the high temperature region.

According to the present invention, the heat radiation efficiency of an integrated radiator can be enhanced not by cooling a stack, a condenser, and an electrical power apparatus individually but by integrally managing a fuel cell stack 16 and an electrical power apparatus 14 using cooling fluid flowing through the single integrated radiator at different rates and at different temperatures.

Further, the integrated radiator 10 is classified into a high temperature region and a low temperature region according to a flow rate and temperature requirements (i.e., cooling requirements) of the cooling fluid, such that a large amount of cooling fluid is guided through a downstream direction for a short period of time in the high temperature region to cool the fuel cell stack 16 which generates a large amount of heat. Furthermore, some cooling fluid, which has passed through the high temperature region, flows in an S-like form in the low temperature region to additionally perform a cooling operation for the electrical apparatus. Thus, the electrical power apparatus 14 generating a small amount of heat can be cooled by using the cooling fluid for the fuel cell stack in the low temperature region.

Moreover, although the amount of air blown by a fan is conventionally set to be excessive to meet the required specifications according to a maximum amount of heat of a fuel cell stack 16, when the vehicle is not travelling at high speeds or when the cooling performance of a radiator is marginal, the amount of air supplied is not necessary. The present invention, however, does not require that the fan be configured to blown more air than is necessary to cool fluid in normal conditions Thus, the entire fuel cell vehicle system can be thermally managed efficiently through the integrated radiator.

In addition, by applying a fluid cooling heat exchanger instead of applying an additional radiator for an electrical power apparatus, i.e., a conventional air cooling heat exchanger, and a condenser, air resistance due to a radiator for an electrical power apparatus and a condenser installed on a front side of the vehicle is reduced, making it possible to simplify a cooling module on the front side of the vehicle. Furthermore, a front collision performance of the vehicle can be enhanced by reducing a size of the cooling module, making it possible to improve production value.

Finally, as a conventional radiator for an electrical power apparatus and a condenser are removed, a flow resistance of air introduced through a grill on the front side of the vehicle is minimized and a capacity of a fan motor is reduced at the same time.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents

What is claimed is:

1. A cooling apparatus for a fuel cell vehicle, comprising:
a single integrated radiator disposed on a front side of the fuel cell vehicle and configured to cool cooling fluid by exchanging heat with exterior air to integrally manage a fuel cell stack and an electrical power apparatus,
wherein a single interior cooling area of the single integrated radiator is divided into a first region and a second region according to a cooling requirements of cooling fluid, wherein the fuel cell stack is cooled with cooling fluid flowing through the first region and the electrical power apparatus is cooled with cooling fluid flowing through the second region,
wherein a flow path within the single interior cooling area of the single integrated radiator is structured so that within the single interior cooling area some of the cooling fluid is passed just through the first region and circulated back into the fuel cell stack and, and some of the cooling fluid is passed sequentially through both the first region and the second region to additionally cool the cooling fluid passed through the first region, wherein the cooling fluid that is passed sequentially through the first region and the second region in the same interior cooling area of the single integrated radiator is configured to cool the electrical power apparatus;
wherein the cooling apparatus further comprises a heat exchanger configured to cool the electrical power apparatus by exchanging heat with the cooling fluid for the electrical power apparatus using some of the cooling fluid flowing through the single integrated radiator to cool the electrical power apparatus.

2. The cooling apparatus of claim 1, wherein the first region is a high temperature region with has a cooling fluid passage extending linearly downward to guide the cooling fluid for the fuel cell stack downward.

3. The cooling apparatus of claim 1, wherein the second region is a low temperature region which has a cooling fluid passage formed in a meandering S-like shape where the cooling fluid passage alternatingly extends upward and downward, and the cooling fluid which has passed through both the first region and the second region is exposed to cooling exterior air for a longer period of time than the cooling fluid passed through just the first region to additionally cool the cooling fluid in the second region.

4. The cooling apparatus of claim 1, further comprising a plate type heat exchanger configured to cool the electrical power apparatus by exchanging heat with the cooling fluid for the electrical power apparatus using the cooling fluid that has flowed through the second region of the single integrated radiator to cool the electrical power apparatus.

5. The cooling apparatus of claim 4, wherein after the cooling fluid for the fuel cell stack which is discharged from the single integrated radiator passes through the plate type heat exchanger, a refrigerant is condensed by a fluid cooling heat exchanger, and the cooling fluid for the fuel cell stack intersects with the cooling fluid for the fuel cell stack which is being discharged from the first region.

\* \* \* \* \*